United States Patent Office 2,819,268
Patented Jan. 7, 1958

2,819,268
NEW CHEMICAL COMPOUND AND ITS METHOD OF PREPARATION

Jacques Baisse and Michel Belalande, Paris, France

No Drawing. Application October 26, 1955
Serial No. 543,000

1 Claim. (Cl. 260—268)

This invention relates to a new and useful chemical compound and to its method of preparation.

The new chemical compound object of this invention is N (ortho-oxybenzoyl) tetramethylene diamine, and can be represented by the following formula:

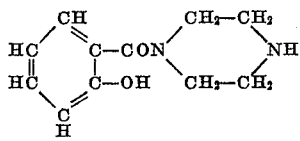

This compound appears in the form of colorless crystals small enough to form a crystalline white powder. It is a little soluble in water, soluble in alcohol and insoluble in ether. It offers an alkaline reaction; its melting point is about 210° C. (computed on the Kofler bench).

This compound possesses antiseptic, analgesic and antirheumatismal properties. It exerts also a toxic action on some viruses or worms. It may therefore be used with advantage as a medicine. For that purpose, this new compound can be used by way of the mouth, in the form of capsules, pellets, or syrup. Or it can be used by way of injection (1) Either after salification by means of an acid such as salicylic acid ($OHC_6H_4COOH$) and dissolution in water (aqueous solution 10%), (2) Or after dissolution in a solvent which can be injected, such as propylene-glycol ($CH_3CHOHCH_2OH$), in a 10% solution.

This compound can be prepared as follows:
200 grams of anhydrous piperazine

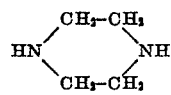

are dissolved in a nonaqueous solvent, such as pyridine for instance

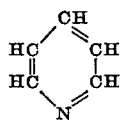

then about 400 grams of phenyl salicylate are added

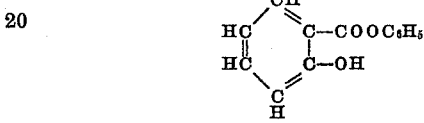

while heating to the boiling point for eight hours; the heating is continued for another eight hours; the mixture is cooled, and ordinary ether is added; the crude product is retreated with alcohol and crystallized in that solvent.

We claim as our invention:

The new chemical compound having the following formula:

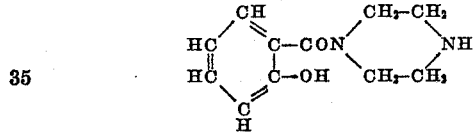

References Cited in the file of this patent
Organic Synthesis, vol. 26, p. 92 (1946).